United States Patent [19]
Elledge

[11] Patent Number: 6,044,399
[45] Date of Patent: Mar. 28, 2000

[54] INFERRING THE IDENTITY OF A PREFERRED SERVER FROM CONFIGURATION INFORMATION

[75] Inventor: Dennis D. Elledge, Nampa, Id.

[73] Assignee: Micron Electronics, Inc., Nampa, Id.

[21] Appl. No.: 09/032,170

[22] Filed: Feb. 27, 1998

[51] Int. Cl.⁷ .................................................. G06F 13/00
[52] U.S. Cl. ............................................................ 709/220
[58] Field of Search .................................... 709/200, 201, 709/203, 217, 218, 219, 220, 221, 223, 224, 225, 226, 229, 236, 238

[56] References Cited

U.S. PATENT DOCUMENTS

| | | | |
|---|---|---|---|
| 5,526,489 | 6/1996 | Nilakantan et al. | 709/228 |
| 5,636,371 | 6/1997 | Yu | 709/227 |
| 5,815,664 | 9/1998 | Asano | 709/227 |
| 5,898,830 | 4/1999 | Wesinger, Jr. et al. | 709/225 |
| 5,917,808 | 6/1999 | Kosbab | 370/254 |
| 5,922,049 | 7/1999 | Radin et al. | 709/220 |

*Primary Examiner*—Moustafa M. Meky
*Attorney, Agent, or Firm*—Dorsey & Whitney LLP

[57] ABSTRACT

An embodiment of the present invention provides a software facility for inferring the identity of a preferred server for use by a computer system. The facility first reads system configuration information describing the configuration of the computer system. The facility also reads configuration mapping information specifying a mapping from system configuration information to preferred servers. The facility then applies the read mapping information to the read system configuration information to identify a preferred server for the computer system. In some embodiments, the computer system proceeds to consume resources of the preferred server identified in this manner.

20 Claims, 5 Drawing Sheets

Fig. 3 configuration information mapping table — 400

| bottom of address range | top of address range | preferred server |
|---|---|---|
| 128.56.3.35 | 128.56.3.35 | \\dallas |
| 128.56.3.38 | 128.56.3.38 | \\dallas |
| 128.56.4.11 | 128.56.4.14 | \\boston |
| 128.56.7.0 | 128.56.9.255 | \\orlando |

401  402  403

*Fig. 4* configuration information mapping table — 500

| destination network path | preferred server |
|---|---|
| \\dallas\userdir | \\dallas |
| \\dallas\applications | \\dallas |
| \\boston\userconfig | \\boston |
| \\orlando\applns | \\orlando |
| \\miami\applns | \\orlando |

INFERRING THE IDENTITY OF A PREFERRED SERVER FROM CONFIGURATION INFORMATION

TECHNICAL FIELD

The present invention relates to the fields of network resource utilization and computer system configuration.

BACKGROUND OF THE INVENTION

Many companies and other geographically distributed organizations operate wide area networks. Such networks typically use long-distance links to connect a number of geographically separate local area networks, which in turn each connect a group of geographically clustered computer systems, such as those in the same building or on the same campus.

Figure 1:
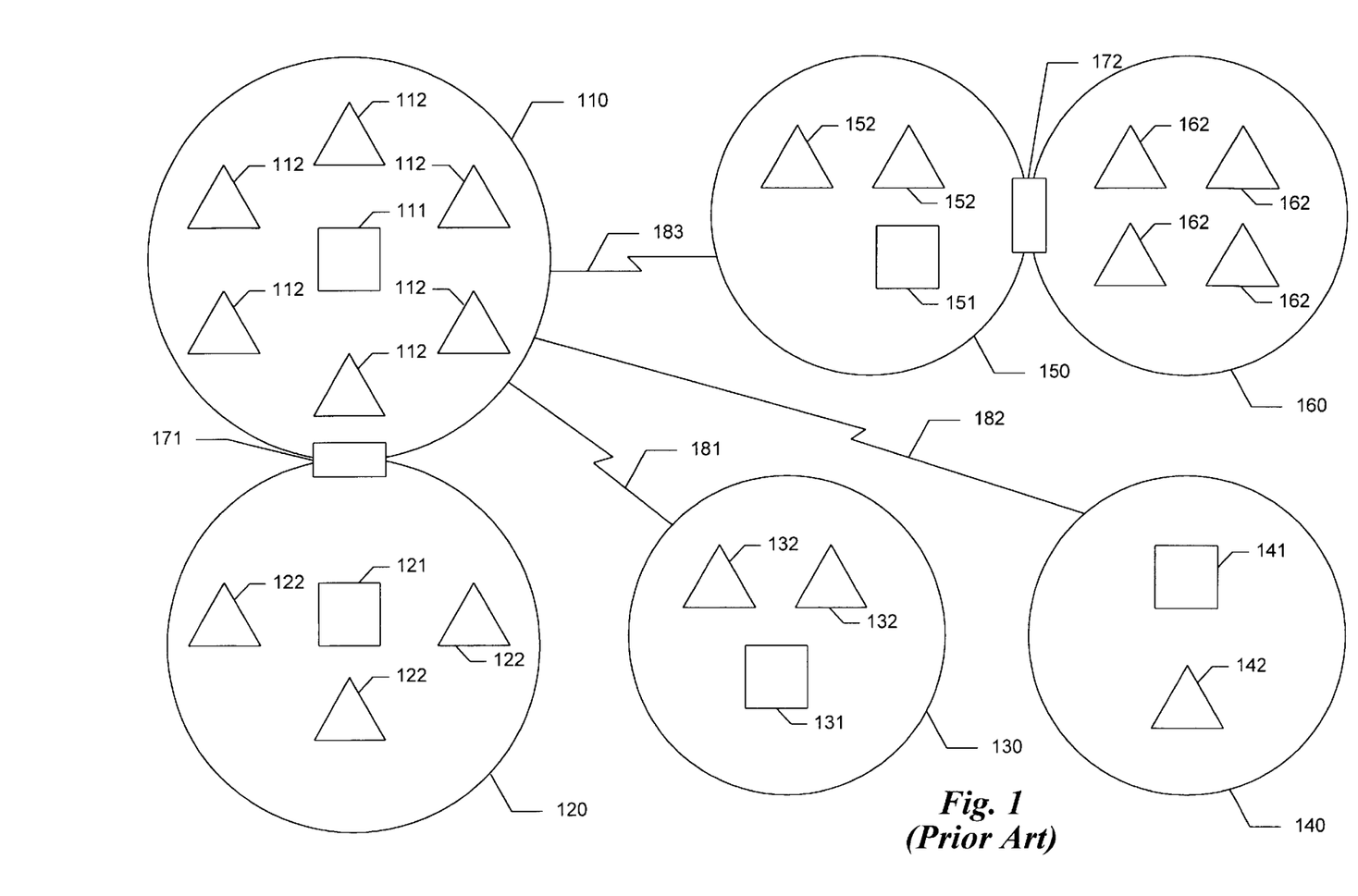
FIG. 1 is a network diagram depicting a typical wide area network.

FIG. 1 is a network diagram depicting a typical wide area network. It shows that the wide area network comprises six different local area networks 110, 120, 130, 140, 150, and 160. Pairs of these local area networks are connected in the wide area network by long-distance links: local area networks 110 and 130 are connected by link 181, local area networks 110 and 140 are connected by link 182, and local area networks 110 and 150 are connected by link 183. Such links may be operated by the organization, or be operated by another company to transmit data on the organization's behalf. Because local area networks 110 and 120 geographically proximal, their connection does not require a long-distance link. They are instead connected by a gateway 171. Local area networks 150 and 160 are also geographically proximal, and are connected by gateway 172.

Many of the local area networks contain server computer systems ("servers"), shown as squares. For example, local area network 110 contains server 111. The servers preferably provide resources, such as the capacity to execute application programs or download application programs and data, to client computer systems ("clients"), shown as triangles (e.g., clients 112 in local area network 110). Utilization by a client of a server's resources generally requires communication between the client and the server. For example, use by a client of a server's capacity to download an application program generally requires the client to transmit a request for the application program to the server, and the server to transmit a reply to the client containing the data comprising the requested application program.

For a particular client, this communication required to use resources of a server has varying financial, performance, and/or congestion costs depending on which server is selected. As a result, selection of a server by a client can have significant consequences. For example, consider one of the clients 112 in local area network 110. For this client, using resources on server 111, which is also in local area network 110, has low performance, financial, and congestion costs: because local area networks are relatively fast, the necessary data is communicated quickly; because the organization owns the local area network, no financial marginal cost is incurred in such communication; and because the local area network 110 has ample capacity, no congestion cost is incurred. In contrast, using servers 121, 131, 141, and 151 has greater performance, financial, and congestion costs. Use by one of the clients 112 of server 131 in local area network 130 may incur significant financial cost if link 181 is not owned by the organization and the organization is charged to transmit data across link 181. Use by one of the clients 112 of server 141 in local area network 140 may incur significant performance cost if local area network 140 is geographically distant from local area network 110, causing a long propagation delay for transmitting data across link 182. A significant performance cost may also be incurred in using server 151 in local area network 150 if link 183 has a low data transmission rate, causing a low throughput rate for the transmitted data. Finally, while using server 121 in local area network 120 may have not have direct financial or performance costs, it may create congestion in gateway 171, indirectly imposing performance costs on other users if use of the gateway by one of the clients 112 delays use of the gateway by other clients 112 or by clients 122. It can therefore be seen that, because of higher financial, performance, and/or congestion costs incurred by using servers 121, 131, 141, and 151, use of server 111 by one of the clients 112 would generally be preferred.

Unfortunately, in some wide area networks, the best available server on which to use resources is not explicitly identified to each client. As a result, clients may choose to use the resources of a distant server, in many cases incurring a significant financial, time, or congestion cost. In some cases, clients may fail to identify any available server whose resources they can use, rendering such clients unable to utilize the resources at any cost.

In view of these shortcomings, a facility capable of inferring the identity of a preferred server for each of the clients would have significant utility.

SUMMARY OF THE INVENTION

Embodiments of the present invention infer, for a client computer system, the identity of a preferred server for providing services to the client computer system. By using the invention, the client computer system can ensure that it obtains services from the best available server. In this way, the client computer system can avoid the larger financial, performance, and congestion costs of using other servers, as well as the problem of not knowing the identity of any server from which to obtain services.

Embodiments of the present invention provide a software facility ("the facility") for identifying a preferred server. The facility preferably executes on a client computer system ("client") that uses the services of one of a number of servers. The facility identifies a preferred server for use by the client using configuration information relating to the client. The configuration information may include a network address, such as an Internet Protocol address ("IP address"), identifying the client within its network, or "drive mappings" defined in the client that map disk drive identifiers (e.g., "G:") to remote file system directories located on other computer systems that are available via the network. The facility first retrieves this configuration information. In clients running the MICROSOFT WINDOWS 95 or MICROSOFT WINDOWS NT operating systems, the configuration information may be retrieved from a central repository for configuration information called the Registry. Those skilled in the art will appreciate that similar configuration information is generally available from various sources in clients running other operating systems as well.

After retrieving the configuration information, the facility uses a configuration information mapping table to determine the identity of the preferred server for the client based on the configuration information. The preferred server identified by the facility may then be used by the client to provide server services to the client. The identity of the preferred server may also be persistently stored, so that the client may use the preferred server at a future time without having to repeat the process of identifying the preferred server. On the other hand, even if the identity of the preferred server is persistently stored, the process of identifying the preferred server may be repeated periodically in order to update the identity of the preferred server in the event that a more suitable server becomes available.

DETAILED DESCRIPTION OF THE INVENTION

Embodiments of the present invention infer, for a client computer system, the identity of a preferred server for providing services to the client computer system. By using the invention, the client computer system can ensure that it obtains services from the best available server. In this way, the client computer system can avoid the larger financial, performance, and congestion costs of using other servers, as well as the problem of not knowing the identity of any server from which to obtain services.

Embodiments of the present invention provide a software facility ("the facility") for identifying a preferred server. The facility preferably executes on a client computer system ("client") that uses the services of one of a number of servers. The facility identifies a preferred server for use by the client using configuration information relating to the client. The configuration information may include a network address, such as an Internet Protocol address ("IP address"), identifying the client within its network, or "drive mappings" defined in the client that map disk drive identifiers (e.g., "G:") to remote file system directories located on other computer systems that are available via the network. The facility first retrieves this configuration information. In clients running the MICROSOFT WINDOWS 95 or MICROSOFT WINDOWS NT operating systems, the configuration information may be retrieved from a central repository for configuration information called the Registry. Those skilled in the art will appreciate that similar configuration information is generally available from various sources in clients running other operating systems as well.

Figure 4:
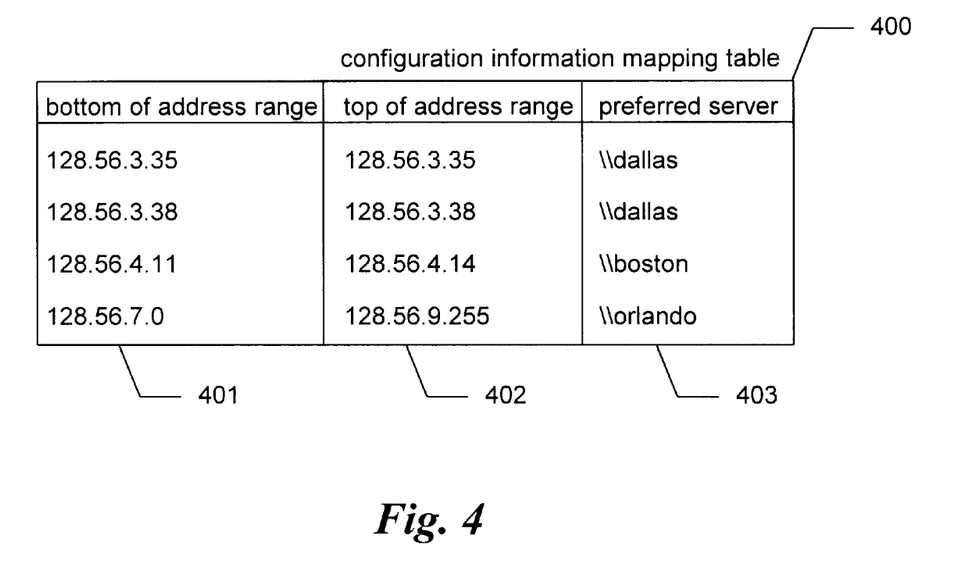
FIG. 4 is a data structure diagram showing a configuration information mapping table for identifying a preferred server using the numerical network address of the client.
Figure 5:
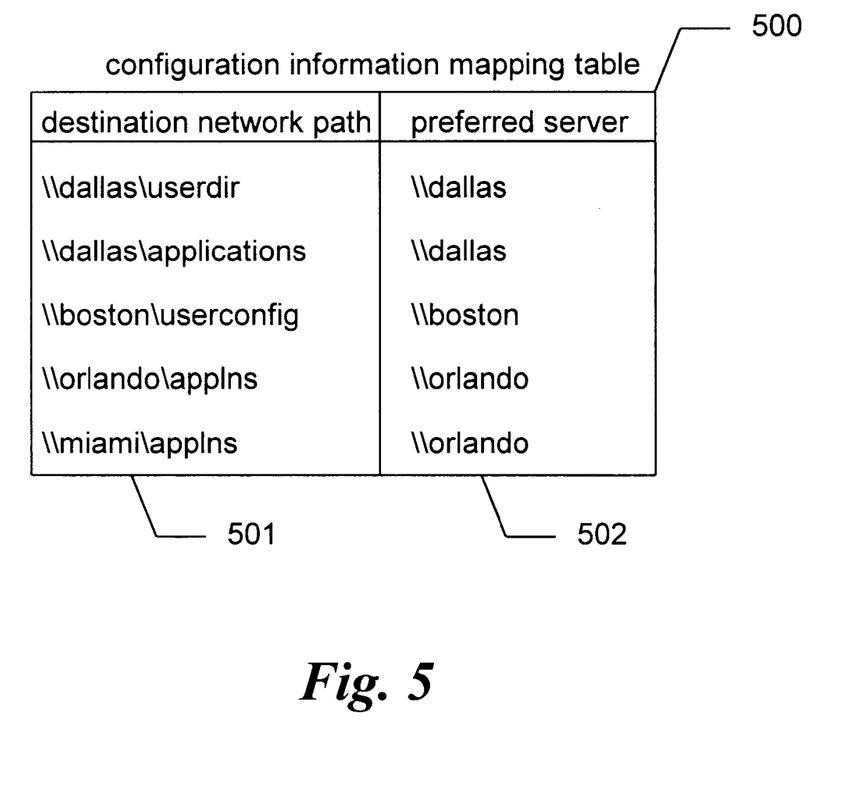
FIG. 5 is a data structure diagram showing a configuration information mapping table for identifying a preferred server using a destination network path from the client's network drive mappings.

After retrieving the configuration information, the facility uses a configuration information mapping table, such as those shown in FIGS. 4 and 5, to determine the identity of the preferred server for the client based on the configuration information. The configuration information mapping table is preferably compiled manually, but may also be compiled automatically. Configuration information mapping tables that can be used by the facility include both tables that map from network address ranges to preferred servers and tables that map from the contents of network drive mappings to preferred servers.

The preferred server identified by the facility may then be used by the client to provide server services to the client. The identity of the preferred server may also be persistently stored, so that the client may use the preferred server at a future time without having to repeat the process of identifying the preferred server. On the other hand, even if the identity of the preferred server is persistently stored, the process of identifying the preferred server may be repeated periodically in order to update the identity of the preferred server in the event that a more suitable server becomes available.

Figure 2:
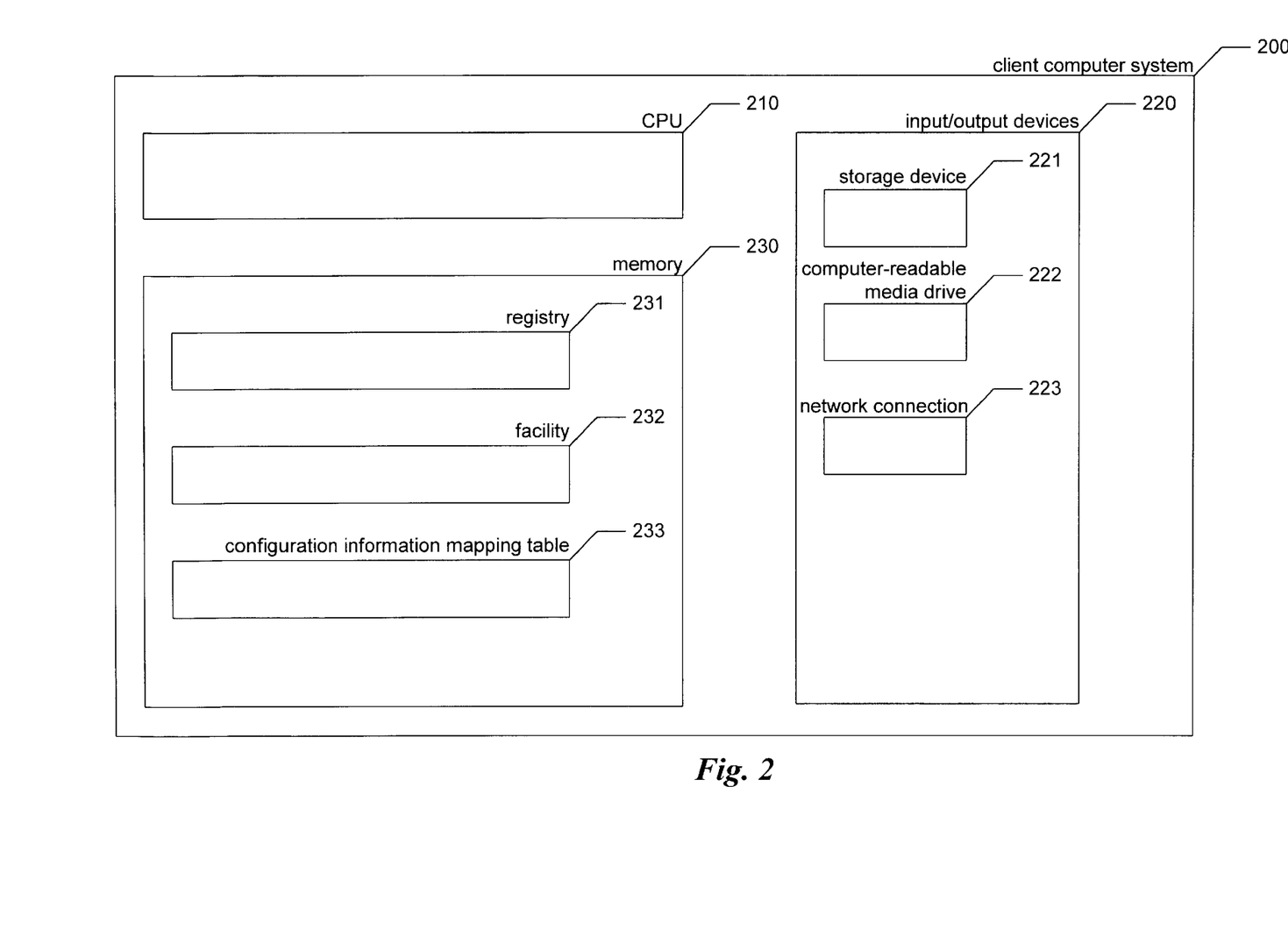
FIG. 2 is a high-level block diagram of an example general-purpose client computer system upon which the facility may execute.

FIG. 2 is a high-level block diagram of an example general-purpose client computer system upon which the facility may execute. The client computer system 200 contains a central processing unit (CPU) 210, input/output devices 220, and a computer memory (memory) 230. Among the input/output devices is a storage device 221, such as a hard disk drive, and a computer-readable media drive 222, which can be used to install software products, including the facility, which are provided on a computer-readable medium, such as a CD-ROM. The input/output devices also include a network connection 223, through which the computer system 200 may communicate with other connected computer systems, such as those shown in FIG. 1. The memory 230 preferably contains a system registry 231 for containing configuration information relating to the client computer system 200, as well as the facility 132 for inferring of a preferred server for use by the client computer system 200. The memory 230 preferably also contains a configuration information mapping table 233 used by the facility to identify a preferred server based upon configuration information. The contents of the memory 230 are preferably stored persistently on the storage device 221, and loaded into the memory when needed. While the facility is preferably implemented on one or more client computer systems configured as described above, those skilled in the art will recognize that it may also be implemented on computer systems having different configurations.

Figure 3:
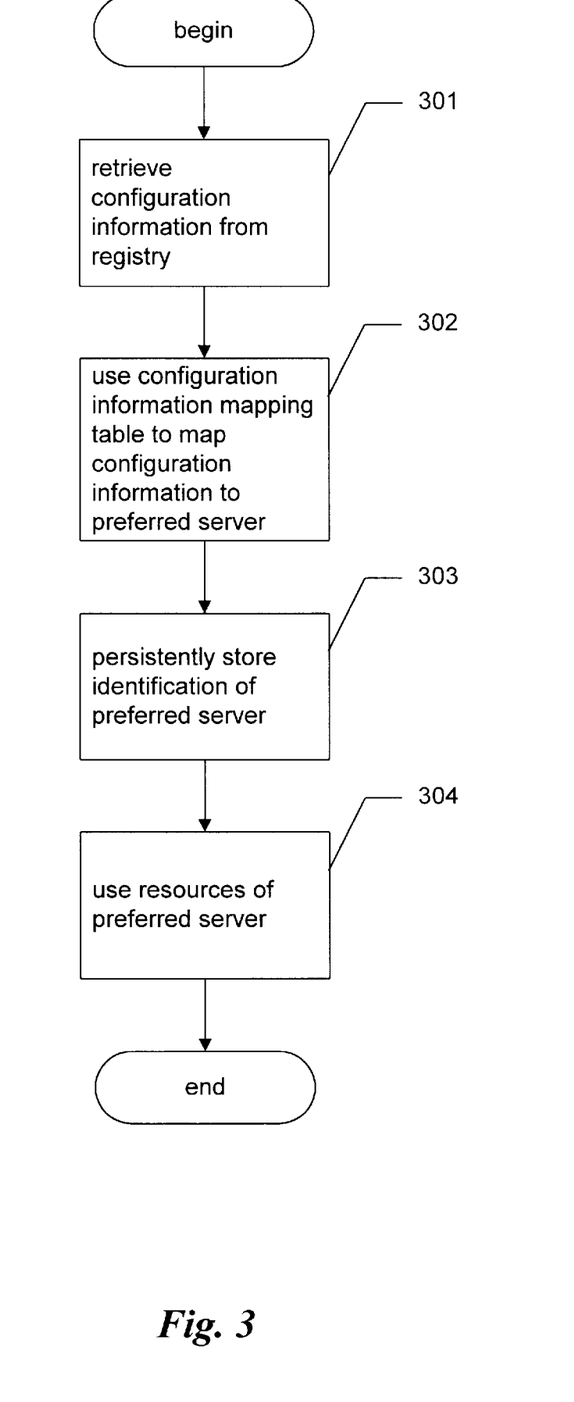
FIG. 3 is a flow diagram showing the steps preferably performed by the facility in order to infer the identity of a preferred server for use by the present server.

FIG. 3 is a flow diagram showing the steps preferably performed by the facility in order to infer the identity of a preferred server for use by the present server. At a high level, these steps retrieve configuration information about the computer system from the registry, and use a configuration information mapping table to identify a preferred server based on the retrieved configuration information. The identity of the preferred server is then stored, and used to use resources of the preferred server. In step 301, the facility retrieves configuration information relating to the configuration of the computer system upon which the facility is executing from the registry. The performance of step 301 is discussed in greater detail below in conjunction with FIGS. 4 and 5. In step 302, the facility uses the configuration information mapping table 233 to map the configuration information retrieved in step 301 to the identity of a preferred server for the computer system 200. In step 303, the facility persistently stores an identification of the preferred server determined in step 302 for future use. In step 304, the facility uses resources of the preferred server. For example, the facility may retrieve programs or data from the preferred server, may use a fax gateway in the preferred server, etc. After step 304, these steps conclude.

As discussed above, the facility may use different kinds of configuration information in order to identify a preferred server for the client. As two examples, the facility may use a numerical network address of the client, or network paths to which disk drive identifiers have been mapped on the client. A discussion of the use of these two types of configuration information by the facility follows.

In one embodiment, the facility identifies a preferred server for the client using a network address that identifies the client within its network. In particular, the facility uses an Internet Protocol address for the client. Internet Protocol addresses each comprise a series of four component values, each between 0 and 255, separated by periods. For clients running the MICROSOFT WINDOWS 95 or MICROSOFT WINDOWS NT operating systems, the Internet Protocol address of the client may be retrieved from the registry using the RegQueryValue API of these operating systems. The RegQueryValue API takes as parameters a "key" and a "value," which together identify particular configuration values within the registry to be retrieved.

In MICROSOFT WINDOWS 95, the Internet Protocol address may be retrieved from the "IPAddress" value of one of the registry keys     HKEY_LOCAL_
        MACHINE\System\CurrentControlSet\Services\Class\
        NetTrans\000<digit> where "<digit>" is replaced with the digits 0–9.

In MICROSOFT WINDOWS NT, the process of retrieving the Internet Protocol address of the client is somewhat more involved. The facility first retrieves the identifier of the network card ("<ncard>") from the "Bind" value of the     HKEY_LOCAL_
        MACHINE\System\CurrentControlSet\Services\NetBT\Linkage key. The facility then retrieves the Internet Protocol address of the client from the "IPAddress" value of the     HKEY_LOCAL_
        MACHINE\System\CurrentControlSet\Services\<ncard>\
        Parameters\Tcpip key if the "EnableDHCP" value of the     HKEY_LOCAL_
        MACHINE\System\CurrentControlSet\Services\<ncard>\
        Parameters\\Tcpip key is zero, or from the "DhcpIPAddress" value of the     HKEY_LOCAL_
        MACHINE\System\CurrentControlSet\Services\<ncard>\
        Parameters\Tcpip key if the "EnableDHCP" value of the     HKEY_LOCAL_
        MACHINE\System\CurrentControlSet\Services\<ncard>\
        Parameters\Tcpip is one.

FIG. 4 is a data structure diagram showing a configuration information mapping table for identifying a preferred server using the numerical network address of the client. While the configuration information mapping tables used by the facility are preferably generated manually by a network administrator, they may also be generated automatically. It can be seen that the configuration information mapping table 400 contains four rows, each corresponding to a different range of network addresses. While the number of rows in the table 400 and in table 500 discussed below is limited to simplify this example, it will be appreciated by those skilled in the art that an actual configuration information mapping table may contain hundreds, or even thousands, of rows each corresponding to a different network address range. Each row in the table 400 contains information in each of three columns: a bottom of address range column 401 containing the smallest network address for the range; a top of address range column 402 containing the largest network address of the address range; and a preferred server 403 containing an identification of the preferred server for clients whose network address falls within the range. One or more rows may be included for each preferred server. For example, the first and second rows both map address ranges to a "\\dallas" server, while only the third row maps a range to the "\\boston" server, and only the fourth row maps a range to the "\\orlando" server. A range may include one network address, or a number of network addresses. For example, the range specified by the first row contains only the network address 128.56.3.35

On the other hand, the third row specifies a range containing four network addresses:

128.56.4.11

128.56.4.12

128.56.4.13

128.56.4.14

Ranges specified by the table may further specify ranges of addresses that span two or more components of the network address. For example, the range specified by the fourth row in the table 400 spans the third and fourth components of the network address:

128.56.7.0

128.56.7.1

. . .

128.56.7.255

128.56.8.0

128.56.8.1

. . .

128.56.8.255

128.56.9.0

128.56.7.1

128.56.9.255

In one embodiment, the table also specifies a default preferred server (not shown) for clients whose addresses do not fall in any of the ranges specified by the table, or whose network address is not known.

In another embodiment, the facility uses network drive mappings on the client to identify a preferred server for the client. For example, if a user of the client frequently retrieves information via the network from the remote file system directory "\\dallas\userdir", the user may map a drive identifier such as "G:" to this remote directory in order to make retrievals from that directory more convenient. Similarly, programs executing on the client may create such mappings in order to access information on other computer systems, such as servers. It is the inventor's observation that certain of such mappings reflect the identity of a preferred server. This is especially true where client software that is uniform across all of the clients regularly maps certain drive identifiers to directories on the preferred server for the client. The destination network paths to which drive identifiers have been mapped on a client may be retrieved by enumerating the keys, each corresponding to a different mapped drive identifier, under the key HKEY_CURRENT_USER\Network\Persistent\ and retrieving the data for the "RemotePath" of each such key. Alternatively, this value may be retrieved only for the key corresponding to a particular drive identifier, such as "G:".

FIG. 5 is a data structure diagram showing a configuration information mapping table for identifying a preferred server using a destination network path from the client's network drive mappings. It can be seen that each of the five rows of the table 500 contains information in a destination network path column 501 and a preferred server 502. As an example, if the client computer system had a network drive mapping from the drive identifier "G:" to the network path "\\dallas\userdir", then the configuration information mapping table would identify "\\dallas" as the preferred server. It can be seen that different destination network paths on the same server, such as those shown in the first and second rows of the table, may map to the same preferred server. It can further be seen that two network paths on different servers, such as those identified in the fourth and fifth rows of the table, may map to the same preferred server. In one embodiment, the table also specifies a default preferred server (not shown) for clients not having a drive identifier mapped to any of the destination network paths specified by the table.

While this invention has been shown and described with reference to preferred embodiments, it will be understood by those skilled in the art that various changes or modifications in form and detail may be made without departing from the scope of the invention. For example, other types of configuration information may be used by the facility to identify a preferred server for the client. Also, identifications of preferred servers generated by the facility may further identify specific resources, such as file system directories, of the preferred servers. Further, for a single client, the facility may identify more than one preferred server, such that the client may use some services of one preferred server and other services of another preferred server. Additionally, the facility may execute on a computer system other than the client for which a preferred server is identified, such as on a server.

I claim:

1. A method in a computer system for identifying a preferred server for use by the computer system, the computer system having a numerical network address, the method comprising the steps of:

determining the network address of the computer system;

retrieving a table indicating, for each of a plurality of ranges of numerical network addresses, a preferred server for computer systems having network addresses within the range;

comparing the determined network address of the computer system to the ranges of the table to identify a preferred server for the computer system; and     retrieving data from the identified preferred server.

2. The method of claim 1 wherein the computer system has a registry for storing configuration information relating to the computer system, and wherein the determining step reads the network address of the computer system from the registry.

3. The method of claim 1 wherein the network address of the computer system is an Internet Protocol address.

4. A method in a computer system for identifying a preferred server for use by the computer system, the computer system having one or more drive mappings from drive designations to network paths, the method comprising the steps of:

retrieving the drive mappings of the computer system;

retrieving a table comprised of entries, each entry having a source network path and a target preferred server that is preferred for computer systems having drive mappings that map a drive designation to the source network path;

if one of the drive mappings maps a drive designation to a source network path contained in the table, selecting the target preferred server for that source network path;

if none of the drive mappings maps a drive designation to a source network path contained in the table, selecting a default server;

receiving a request satisfiable using server resources; and     satisfying the request using the selected server.

5. A method in a computer system having a configuration for identifying a preferred server for use by the computer system, the method comprising the steps of:

reading system configuration information describing the configuration of the computer system;

reading configuration mapping information specifying a mapping from system configuration information to preferred servers; and     applying the read mapping information to the read system configuration information to identify a preferred server for the computer system.

6. The method of claim 5 wherein the computer system has a registry data structure containing system configuration information, and wherein the step of reading system configuration information reads system configuration information from the registry.

7. The method of claim 5 wherein the computer system has a network address, and wherein the step of reading system configuration information reads the network address of the computer system.

8. The method of claim 5 wherein the computer system has an Internet Protocol address, and wherein the step of reading system configuration information reads the Internet Protocol address of the computer system.

9. The method of claim 5 wherein the computer system has one or more drive mappings from drive designations to network paths, and wherein the step of reading system configuration information reads these mappings from drive designation to network paths.

10. The method of claim 5, further comprising the step consuming resources of the preferred server based on the identification of the preferred server.

11. The method of claim 10 wherein the consuming step retrieves an application program from the preferred server.

12. The method of claim 5, further comprising the step of persistently storing an identification of the preferred server for future use in consuming resources of the preferred server.

13. A computer-readable medium whose contents cause a computer system having a configuration to identify a preferred server for use by the computer system by performing the steps of:

reading system configuration information describing the configuration of the computer system;

reading configuration mapping information specifying a mapping from system configuration information to preferred servers; and applying the read mapping information to the read system configuration information to identify a preferred server for the computer system.

14. The computer-readable medium of claim 13 wherein the computer system has a network address, and wherein the step of reading system configuration information reads the network address of the computer system.

15. The computer-readable medium of claim 13 wherein the computer system has one or more drive mappings from drive designations to network paths, and wherein the step of reading system configuration information reads these mappings from drive designation to network paths.

16. The computer-readable medium of claim 13 wherein the contents of the computer-readable medium further cause the computer system to perform the step consuming resources of the preferred server based on the identification of the preferred server.

17. A computer memory containing a preferred server mapping data structure for use in identifying, for a particular client computer system, a preferred server to use, the data structure comprising a plurality of entries, each entry containing an identification of one or more computer system configuration information values and an identification of a preferred server for client computer systems having one of the identified computer system configuration information values, such that, for a selected client computer system having a selected configuration information value, the data structure may be used to identify a preferred server for the selected client computer system to use by selecting an entry identifying the selected configuration information value, and by determining the server identified by the selected entry.

18. The computer memory of claim 17 wherein the configuration information values stored in the data structure are Internet Protocol addresses.

19. The computer memory of claim 17 wherein the configuration information values stored in the data structure are drive mappings, each mapping a drive designation to a network path.

20. A computer system for identifying a preferred server for use by the computer system, the computer system having a configuration, comprising:

a memory containing:

a configuration data structure containing configuration values reflecting the configuration of the computer system, and a configuration mapping data structure containing mappings from possible configuration values to preferred servers for computer systems having such possible configuration values; and a processor for identifying a preferred server for use by the computer system by reading a configuration value from the configuration data structure and identifying a preferred server mapped to from the read configuration value in the configuration mapping data structure.

* * * * *